US012147864B2

(12) United States Patent
Mendez et al.

(10) Patent No.: US 12,147,864 B2
(45) Date of Patent: Nov. 19, 2024

(54) METHOD FOR MANUFACTURING A METAL CHIP CARD WITH MINI RELAY ANTENNA

(71) Applicant: THALES DIS FRANCE SAS, Meudon (FR)

(72) Inventors: Lucile Mendez, Peypin (FR); Frédérick Seban, Auriol (FR); Claude Colombard, Pertuis (FR); Arek Buyukkalender, Marseilles (FR); Jean-Luc Meridiano, Tourves (FR)

(73) Assignee: THALES DIS FRANCE SAS, Meudon (FR)

( * ) Notice: Subject to any disclaimer, the term of this patent is extended or adjusted under 35 U.S.C. 154(b) by 12 days.

(21) Appl. No.: 17/641,189

(22) PCT Filed: Sep. 8, 2020

(86) PCT No.: PCT/EP2020/075113
§ 371 (c)(1),
(2) Date: Aug. 9, 2022

(87) PCT Pub. No.: WO2021/048148
PCT Pub. Date: Mar. 18, 2021

(65) Prior Publication Data
US 2023/0237305 A1     Jul. 27, 2023

(30) Foreign Application Priority Data
Sep. 9, 2019   (EP) .................................... 19306078

(51) Int. Cl.
*G06K 19/06*      (2006.01)
*G06K 19/077*     (2006.01)

(52) U.S. Cl.
CPC ... *G06K 19/07773* (2013.01); *G06K 19/0772* (2013.01)

(58) Field of Classification Search
CPC ......... G06K 19/07749; G06K 19/0723; G06K 19/0772; G06K 19/07773; G06K 19/07;
(Continued)

(56) References Cited

U.S. PATENT DOCUMENTS 8,516,683 B2 *   8/2013   Credelle ............... H01Q 7/00
                                                      29/601
9,619,743 B1 *   4/2017   Yan ..................... G06K 19/0776
(Continued)

FOREIGN PATENT DOCUMENTS

FR     3032294 A1      8/2019
WO     WO2016188920 A1   12/2016

OTHER PUBLICATIONS

English Version International Search Report (PCT/ISA/210) and Written Opinion (PCT/ISA/237) mailed on Nov. 2, 2020, by the European Patent Office as the International Searching Authority for current International Application No. PCT/EP2020/075113—[9 pages].
(Continued)

*Primary Examiner* — Daniel St Cyr

(57) ABSTRACT

Provided is a method for manufacturing a radiofrequency chip card. The method comprises the steps of: forming a card body comprising a relay antenna and an insulating cover layer on at least one main face of the card, arranging a module equipped with a radiofrequency module antenna on the card body opposite the relay antenna for radiofrequency coupling; forming a metal insert in the card body, the insert extending up to the edges of the card and comprising a space permeable to the radiofrequency field opening on at least one of the two main faces of the insert and comprising the relay antenna inside and/or opposite this space. Provided also is a corresponding card produced by the method.

14 Claims, 3 Drawing Sheets

(58) Field of Classification Search
CPC ... G06Q 20/3278; G06Q 20/352; G06F 21/77
USPC .......................................... 235/492, 487, 488
See application file for complete search history.

(56) References Cited

U.S. PATENT DOCUMENTS

| | | | |
|---|---|---|---|
| 10,242,308 B2* | 3/2019 | Yan .................... | G06K 7/10336 |
| 2008/0203173 A1* | 8/2008 | Baba .................. | G06K 19/0775 |
| | | | 235/492 |
| 2014/0209691 A1 | 7/2014 | Finn et al. | |
| 2015/0186768 A1* | 7/2015 | Peters .............. | G06K 19/07773 |
| | | | 235/492 |
| 2016/0365644 A1 | 12/2016 | Finn et al. | |

OTHER PUBLICATIONS

International Search Report (PCT/ISA/210) and Written Opinion (PCT/ISA/237) mailed on Nov. 2, 2020, by the European Patent Office as the International Searching Authority for International Application No. PCT/EP2020/075113—[14 pages].

* cited by examiner

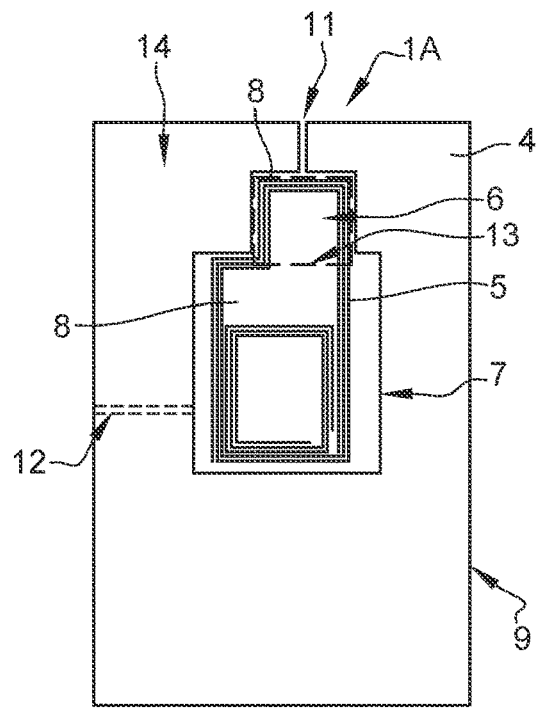
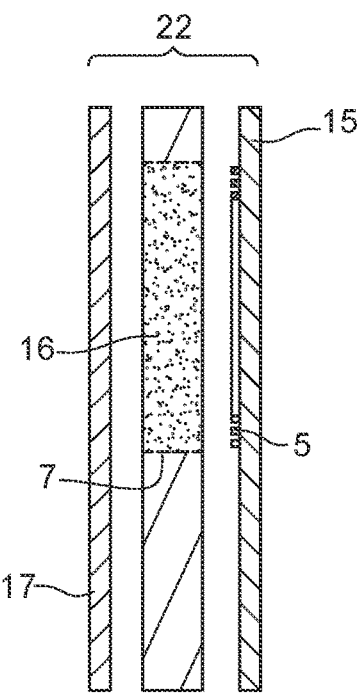
Fig. 1   Fig. 2
Fig. 3
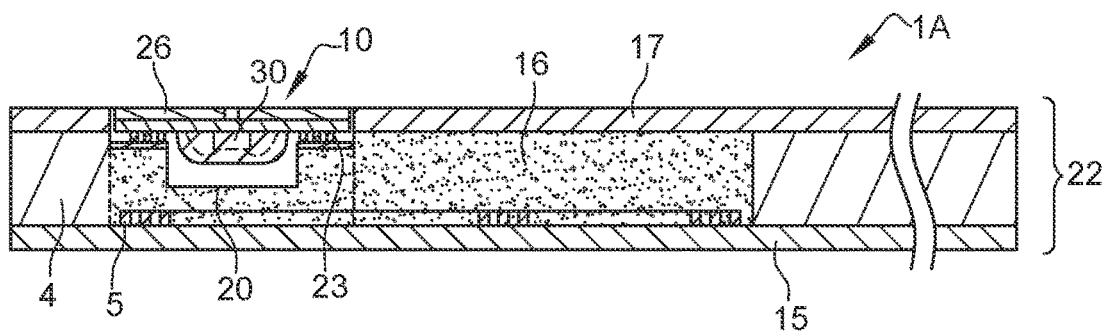
Fig. 4
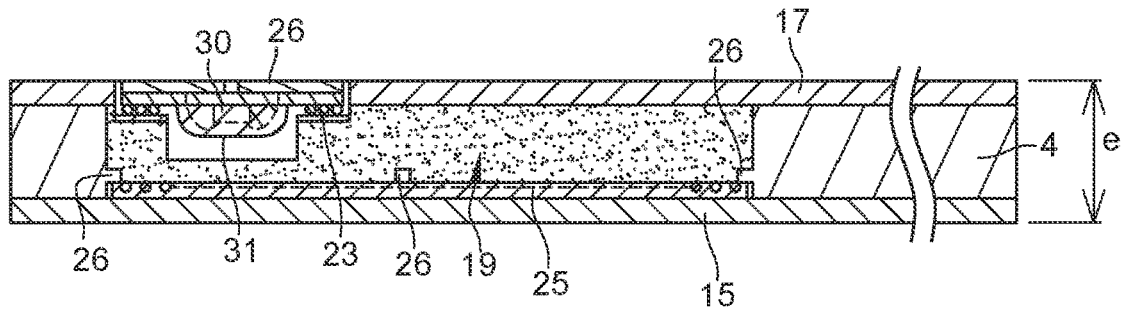

METHOD FOR MANUFACTURING A METAL CHIP CARD WITH MINI RELAY ANTENNA

FIELD OF THE INVENTION

The invention relates to the field of contactless metal chip cards comprising radiofrequency integrated circuit chip modules.

It is aimed in particular at the manufacture of chip cards comprising one or more metal sheets or plates.

Chip cards can be of the hybrid type (contact and contactless) or purely contactless (without electrical contacts).

Chip cards can have a chip card module comprising, on an insulating substrate, a radiofrequency transponder comprising the chip and the antenna. These radiofrequency chip card modules are generally embedded in a cavity of the card body.

The invention is aimed more particularly at bank cards comprising a predominantly metal body.

PRIOR ART

Patent FR 2743649 describes a chip card module, with antenna and/or contact pads, which can be incorporated into a card body cavity or can form an electronic RFID tag.

Patent EP1031939 (B1) describes a radiofrequency (or contactless) card comprising a coiled figure-eight relay antenna housed in a card body and electromagnetically or inductively coupled with the module antenna. The relay antenna comprises a narrow coil concentric with the module antenna and a wide coil to pick up the electromagnetic field from a reader.

Furthermore, hybrid radiofrequency devices, such as contact and contactless cards, are also known, comprising a contact chip card module incorporated into a card body and connected to an antenna housed in the card body.

In addition, there are bank cards comprising metal elements inserted inside the plastic card body or on the outer surface of the card body, such as aluminum, titanium, and gold. The metal provides a heavy feel to the card that is much appreciated by users. It also gives a visible aesthetic aspect that makes it a high-end product for the privileged.

Technical Problem

There is currently an increased public demand for heavy-duty chip cards that incorporate metallic materials. However, the presence of metal strongly interferes with radiofrequency communication, and manufacturing methods to obtain cards that comply with current chip card standards are more complex.

The purpose of the invention is to provide an easy (or simplified) method for manufacturing chip cards, which can be applied preferably to cards with metal in the card body.

In particular, the invention is directed to a card structure with a radiofrequency (RF) electronic chip module.

The card can also have a structure that satisfies ISO constraints of mechanical strength and durability over time. Such cards can be compliant with the ISO 78016 and/or ISO/IEC 14443 standard or equivalent to perform contact and/or proximity communication exchanges with a contact or NFC type reader.

The invention also provides a metal card structure with visible metal edges that provides maximum weight and good RF performance while being easy to manufacture.

The invention aims at solving the above-mentioned drawbacks or objectives.

SUMMARY OF THE INVENTION

According to a preferred embodiment, the invention consists of ensuring the radiofrequency function of a radiofrequency transponder module is provided by means of a relay antenna (or passive or amplifying antenna) arranged in the metal card body.

The radiofrequency module is preferably closely coupled by electromagnetic induction with a relay antenna whose dimensions allow a sufficient electromagnetic field collection surface to compensate for communication disturbances existing in the metal cards.

The invention may provide for the use of a contactless mini tag (radiofrequency device comprising a radiofrequency transponder or a radiofrequency module) associated with a relay antenna (with or without ferrite), the tag can be in the format of a cavity provided in a metal plate.

The antenna can preferably be made by embedding a conductive wire in a polymer sheet, in particular one made of PVC.

Preferably, the antennas of the radiofrequency transponder module and the relay antenna have a coupling surface portion facing each other.

Preferably, the relay antenna has an area at least equal to that of an external chip card module surface that extends beyond the coupling surface of the radiofrequency module. For example, a module area is 1.5×1 cm and the area of the relay antenna extending beyond the module area may be for example at least equal to this area.

Preferably, this area outside the plumb line of the module can be 2 to 4 times the area of a module. This surface may represent an electromagnetic field collection surface within a metal plate and free of metal in the vicinity of the coupling or collection surface.

Preferably, each cavity or RF module slot or relay antenna slot can be configured to form a coupling plane facing each other, respectively.

A first step may be to insert a relay antenna insert into a space or housing on the back side of a metal plate, and then insert the transponder antenna module into a cavity on the front side opposite the back side in order to have the two antennas coupled together for improved communication performance.

Any assembly means, such as adhesives or other mechanical mounting elements, may be optionally provided to join the two modules.

In one practical embodiment, the relay antenna may be formed as needed by (or embedded in) a substrate or block of polymeric material or any material permeable to electromagnetic fields, the dimensions of which correspond to those of a recess (or cavity) in a metal plate.

The radiofrequency transponder chip module can be mounted on an insert itself before or after the antenna is assembled in the metal plate.

The relay antenna can be deposited bare in the second cavity, then coated with resin or formed on a dielectric substrate in the manner of a chip card module.

To this end, the invention has as its object a method for manufacturing a radiofrequency chip card, said method comprising the steps of:

forming a card body comprising a relay antenna and an insulating cover layer on at least one main face of the card, arranging a module equipped with a radiofrequency module antenna, on the card body opposite the relay antenna for radiofrequency coupling; The method is characterized in that it comprises the following steps: forming a metal insert (4) of the card body extending to the edges of the card, said insert comprising a space permeable to the radiofrequency field opening onto the two main faces of the insert and comprising said relay antenna inside and/or opposite this space.

DESCRIPTION OF FIGURES

FIG. 1A shows a step of manufacturing a radiofrequency card undergoing assembly, with a space 7 for receiving the relay antenna according to the preferred mode of the invention;

FIG. 2 is a view similar to FIG. 1A showing a metal plate 4 being assembled onto cover sheets;

FIG. 3 shows a cross sectional view of an example card 1A obtained according to a first embodiment, which may comprise the elements of FIG. 1, after insertion or assembly of a transponder module 10 and a module comprising the relay antenna;

FIG. 4 shows a cross sectional view of a second example card obtained according to a second embodiment, which may comprise the elements of FIG. 1, after insertion or assembly of a transponder module 3 and a module comprising the relay antenna;

DESCRIPTION

Figure 5:
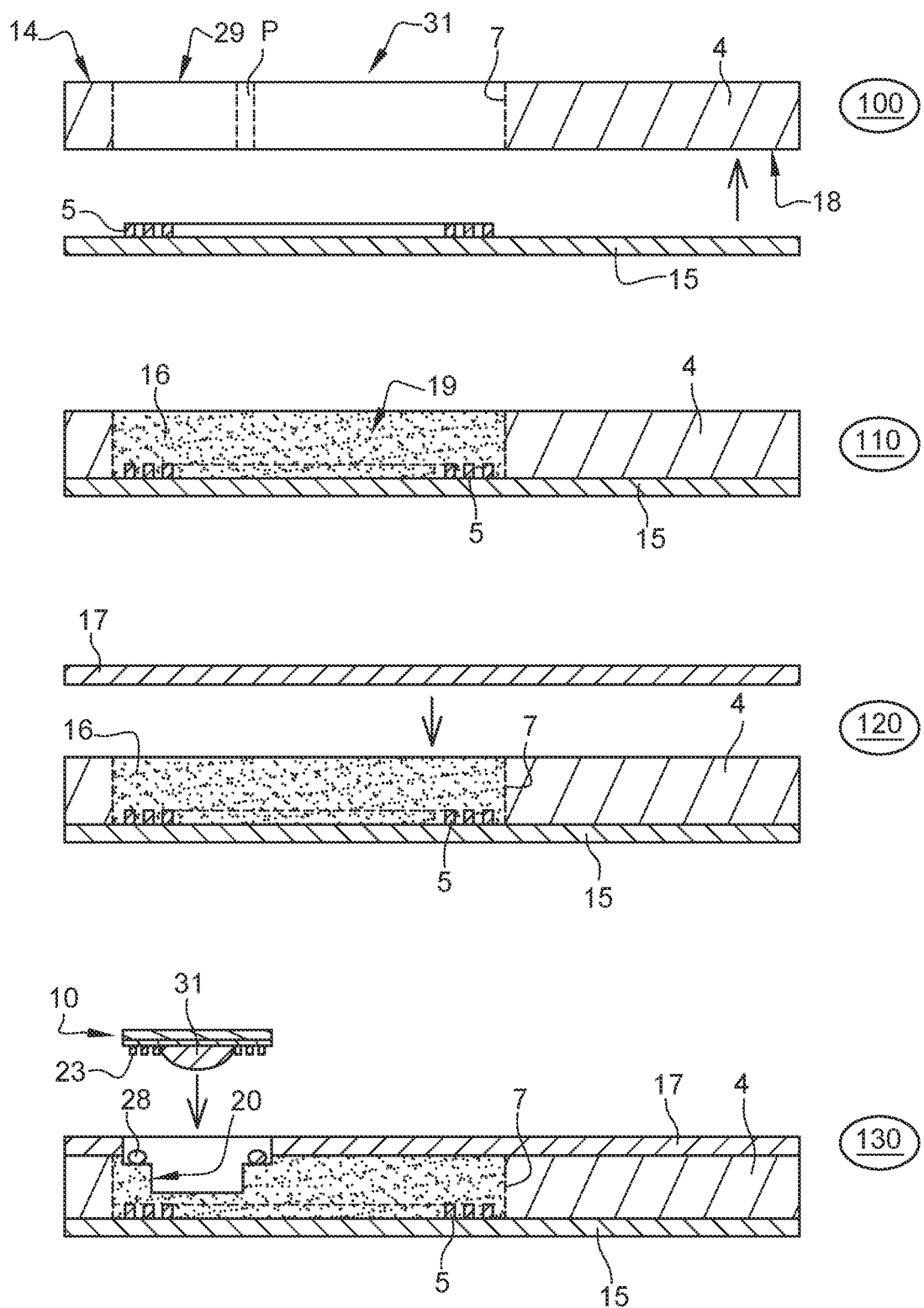
FIG. 5 shows steps of the method of the invention according to the first embodiment according to FIGS. 2 to 3.

In general, identical or similar references from one figure to another represent an identical or similar element.

FIG. 1 shows a step in the method for manufacturing a radiofrequency chip card.

In a preferred embodiment, the method comprises forming a metal card body insert 1A having a relay antenna 5; It also comprises a step of arranging a radiofrequency chip and antenna module 10 on the card body in a slot 6 opposite the relay antenna 5 for radiofrequency coupling with the radiofrequency transponder module 10.

In the example, the insert 1A comprises or is formed of a metal plate 4. Alternatively, it could comprise several plates (or other metal elements) assembled together. The edge 9 of the plate 4 is preferentially intended to be visible from outside the card body 22 (FIGS. 2, 3).

A relay antenna 5 is arranged in the card body, particularly in a corresponding space in the metal insert. However, it can be placed opposite a corresponding space cut into the plate(s).

A radiofrequency antenna and chip module can be arranged in the slot 13 on the card body opposite the relay antenna for radiofrequency coupling.

Alternatively, the module 10 can be directly arranged on the relay antenna (or its supporting substrate 15).

We will see later on different possibilities to arrange the transponder module 10 in relation to the relay antenna 5 and/or the card body 22.

According to a characteristic of the preferred mode, the method comprises the step of forming in the insert a space 7 permeable to the radiofrequency field, opening on at least one main face 14 of the insert, said space being configured to fit the dimensions of said relay antenna 5 to receive it inside and/or opposite this space.

In the example of FIG. 1A, (corresponding to step 100, FIG. 5) the space 7 was machined by stamping or milling into the metal plate 4.

The method can provide for the production of a single plate 4 or a series of plates on a large metal plate (or a metal strip) which will then be cut or stamped to extract each plate.

The permeable space 7 may be in the form of a first recess 6 in a transponder coupling area in line with the slot 8 of the radiofrequency transponder 10 and a second recess 8 extending towards the center of the plate from the first recess 6. The two recesses can preferably communicate with each other, but this is not essential. There can be a separation between the two, for example a metal barrier of the plate 4.

The space 7 is permeable because it is free of metal following its removal by machining.

The space 7 is machined or sized to substantially match the dimensions of the relay antenna 5. The relay antenna can be comprised in the space 7 (as with a relay antenna module inserted in the space (FIGS. 3 and 4); Alternatively (not shown), the relay antenna can be outside this space while facing it (particularly for an antenna embedded in a sheet 15 assembled onto the plate 4).

The plate 4 may comprise a slit 11 intersecting the plate through its thickness and extending from an outer periphery (or edge) 9 of the plate to an inner periphery of said space 7 (or 8) permeable to the radiofrequency field. However, thanks to the performance of a relay antenna associated with the transponder module, this slit 11 (or air gap) is not necessary to satisfy banking standards for performance.

Another alternative slit 12 (or one additional slit relative to slit 14), may open into the second recess.

According to an additional feature, the method of the preferred mode may provide for covering said space 7 with a filler material 16 and/or assembling a cover sheet 15 (and/or 17) onto at least one (or both) main faces of the insert.

In the example shown in FIG. 5, corresponding to step 100, a sheet 15 comprising the relay antenna 5 is laminated and/or bonded to the metal plate after it has been hollowed out to form the space 7.

Another sheet 17 can be assembled (step 120) on the opposite face 18 of the plate 4 from that receiving the first sheet 15, after the filler material 19 has been deposited in the space 7.

The space 7 can be filled with a filler, stuffing material 19 such as a polymer resin.

Alternatively, the thick cover sheets 15, 17 can flow into the space or gap J to fill it during a pressing and heating of these sheets.

Alternatively, the material 19 can be introduced into the space 7 via a hole in one of the two sheets 15 or 17.

According to one characteristic, the relay antenna can be realized on a support substrate 15, 25 as in FIG. 2, 4 or 5 and then the relay antenna substrate is inserted into the permeable space.

In FIGS. 2, 3 and 5, the substrate sheet 15 is assembled onto the underside 18, extending the thickness of the plate.

On the other hand, in another embodiment (FIG. 4), the substrate 25 has dimensions substantially smaller than the dimensions of the cavity 7 and can therefore be inserted into the thickness "e" of the plate 4;

Alternatively, the relay antenna 5 may not be formed on a substrate but may be pre-cut from metal and then placed in the cavity 7 on an insulating plate bottom (for example, a sheet 15 without an antenna preformed on it).

The antenna can be formed using any antenna forming technology known to the skilled person, in particular by printing or jetting conductive material.

In FIG. 4, the substrate 25 carrying the relay antenna 5 may be wedged into the space 7 with the help of protrusions or shoulders 26 extending from the inner side of the space 7 towards the inside of the space.

The space 7 can thus be configured to form a wedge plane for a support substrate 25 of the relay antenna 5 within the thickness of the insert or plate 4.

Here the antenna is ultrasonically embedded in the support substrate 25. And another cover or decorative sheet 15 is assembled to cover the opening of the space 7 over the relay antenna substrate.

In step 130, (FIG. 5), the method may include forming a cavity 20 (or slot) receiving a radiofrequency transponder module 10 and then embedding the module in its slot 6, 13 for inductive coupling with the relay antenna 5.

FIG. 3 shows a chip card insert or radiofrequency chip card 22. The card comprises a card body insert 22 with a relay antenna 5 and a module 10 equipped with a radiofrequency module antenna 23, arranged on the card body 22, facing the relay antenna 5 for radiofrequency coupling therewith;

The card further comprises a space 7 permeable to the radiofrequency field, formed in the metal plate 4 and opening onto at least one main face of the metal plate; The space is configured to the dimensions of the relay antenna 5 to receive it inside and/or to be opposite the relay antenna;

The card further comprises a filler material 16 or 19 covering the space 7. The card may comprise, alternatively or cumulatively to this material 16, 19, a cover sheet 17 assembled onto at least one main face 14 of the insert 22 or of the plate 4.

FIG. 4 differs from the previous figure in that the relay antenna substrate 25 is inserted into the thickness "e" of the metal plate 4. The substrate 25 normally receives another cover sheet 15 on its outer face.

In FIG. 3, the antenna is formed or supported directly on the cover sheet or outer sheet 15 for ease of implementation.

According to an advantageous characteristic, the invention may provide for the separate realisation of a "tag" assembly (block or radiofrequency transponder assembly) comprising an assembling of the relay antenna with the radiofrequency module; Then this "tag" assembly is inserted into the space 7. The assembly may or may not comprise ferrite. Such a tag is disclosed by the applicant under the reference Thales DIS/0159GCTA.

The tag preferably comprises a purely radiofrequency module without contact pads 26.

Such a tag may comprise a block structure comprising the relay antenna embedded in an insulating body and a radiofrequency module coupled to this relay antenna.

Figure 6:
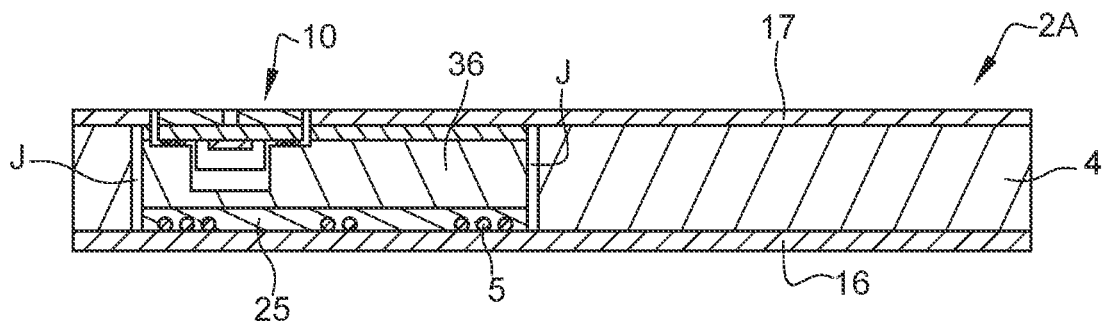
FIG. 6 shows a hybrid card structure (contact and contactless) obtained according to a third embodiment with a relay antenna block inserted in a metal plate.

This block can be cut or shaped to the dimensions of the space 7 and then inserted into space 7 of plate 4. Then, a cover sheet can be assembled on each face 14, 18 of the plate, in particular with the help of a resin which can glue the sheets and fill the gap (J) between the block "tag" structure and the internal edges of the space 7 (FIG. 6).

The relay antenna may preferably be an optimized relay antenna configured without a capacitor plate, with a second loop (or spiral) entangled in a first loop (or spiral) in the opposite direction. The principle of such a relay antenna is described in the international patent application WO2016188920; The structures corresponding to the different variants described in this international application are integrated in the present application.

The relay antenna may have a total area of between ⅓ and ¼ of the main area of the card.

The relay antenna may for example have a total area equal to 6 or 7 times the area of the antenna 23 of the module.

A radiofrequency module 10 according to the invention may comprise those known from the field of chip card.

A chip card module may comprise an insulating substrate, a radiofrequency transponder comprising the chip 30 and the module antenna 23. These radiofrequency chip card modules are generally embedded in a cavity 20 of the card body 22. The radiofrequency chip 30 and its connections to the module antenna may be encapsulated with protective material or resin 30.

Alternatively, the module may have a thinner structure if manufactured like that of an RFID tag.

The invention may have the advantage of reusing a known structure of a (mini) tag to insert it such as in a space in a metal plate 4 and thus form a heavy-duty metal contactless card with good radiofrequency performance.

The performance is substantially the same as the tag alone since the space of the tag in the plate 4 is permeable to the electromagnetic field.

In FIG. 6, a metal card 2A is shown which differs from the structure of FIG. 4 in that the relay antenna 5, or its supporting insert or substrate 25, is joined to a polymer block or polymer card body 36 prior to its assembly into the card 2A.

The insert or block 36 may have an gap J in its joining with the plate 4. This gap can be filled either by lamination or by adding resin or adhesive to join the cover sheets 16, 17. The antenna module 10 is mounted as in FIG. 3 or 4.

Figure 8:
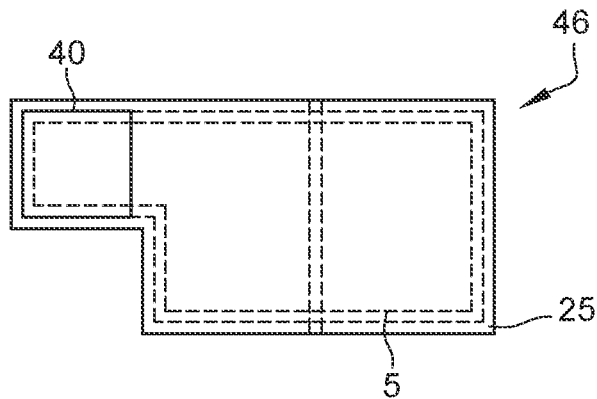
FIG. 8 shows a relay antenna block with a module slot 40 (hybrid or purely contactless).

The block 36 (FIG. 8) can then be cut or extracted (to the dimensions of the cavity 7 of the plate 4, especially by punching) from a large sheet comprising a plurality of relay antennas. FIG. 8 may illustrate the relay antenna 5 either on a substrate 25 or on a block 46 (5, 25, 36) comprising an insulating material 36 joined to the relay antenna 5 substrate 25.

Alternatively, according to a practical embodiment, the relay antenna 5 can be formed on (or embedded in) a substrate or block of polymeric material (moulding resin) or any material permeable to electromagnetic fields and whose dimensions substantially correspond to or are slightly smaller than those of a recess (or cavity) 7 in a metal plate 4.

Figure 7:
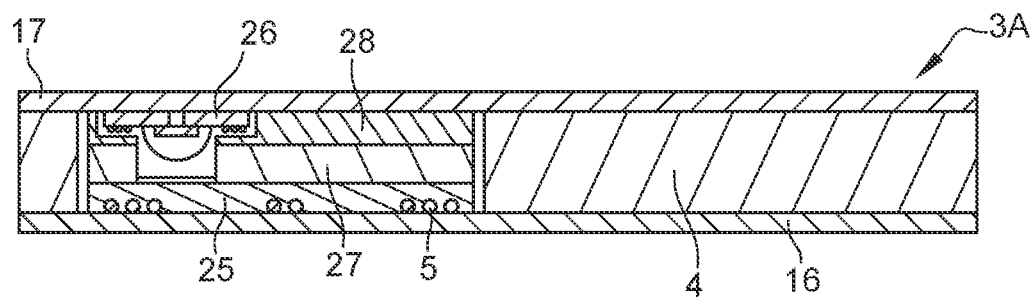
FIG. 7 shows a purely contactless card structure obtained according to a third embodiment with a block comprising a relay antenna and a radiofrequency chip module inserted into a metal plate.

As an alternative to FIG. 6, a further embodiment is shown in FIG. 7 which differs from FIG. 6 in that the relay antenna block 46 itself comprises a purely radiofrequency module (without external contact pads 26).

The relay antenna block 46 may comprise a ferrite core 27 assembled between the relay antenna substrate 25 and an insulating sheet or layer, particularly a polymeric one 28. This core may extend over the entire surface of the insert 46. There may be a cavity for receiving a purely contactless module portion 40 provided in this ferrite core or plate.

All or part of this block 46 can include ferrite, in particular between layers 25 & 26 (for greater coupling between the relay antenna and the transponder).

The radiofrequency transponder chip module 40 can be mounted on an insert 46 of the relay antenna, itself before or after being assembled in or with the metal plate.

The relay antenna 5 can be placed bare in the second cavity or recess of the plate and then covered with resin. It can be formed on a dielectric substrate, in particular by electrochemical etching, like a chip card module on a dielectric insulating tape.

The relay antenna can preferably be manufactured or configured to form a capacitor due to the interleaved turns. Alternatively, the relay antenna may include a capacitor in the form of an integrated circuit component or SMD (surface mount circuit). The advantage is to confine the capacitance function within a small circuit (instead of capacitor plates which can disturb the electromagnetic field reception) to keep an electromagnetic permeability of the material located in the coupling surface of the relay antenna. Historically, a base station antenna had capacitor plates large enough to form a capacitor (patent EP1031939 (B1).

The invention optimises the maximum weight of the metal plate of a metal chip card. It makes it possible to maintain a maximum weight and optimised radiofrequency performances.

The published prior art did not make it possible to have such heavy-duty metal cards with sufficient performance to satisfy communication standards, notably ISO 14443 & EMVCO. In addition, these maps required (contrary to the invention) making a slit 11 (or air gap) extending from the edge of a plate to a receiving space of an antenna module or the cavity 7 (slit 12).

The invention claimed is:

1. A method of manufacturing a radio frequency smart card (1A), said method comprising the steps of:
    forming a card body comprising a relay antenna and an insulating cover layer on at least one main face of the card,
    arranging a module equipped with a radiofrequency module antenna, on the card body facing the relay antenna for radiofrequency coupling; and
    forming a metal insert in said card body, said insert extending up to the edges of the card and comprising a space permeable to the radiofrequency field opening on at least one of the two main faces of the insert and comprising said relay antenna inside and/or opposite this space,
    wherein said relay antenna has a total area equal to three or four times the area of the antenna of the module;
    wherein the substrate of the relay antenna with said total area is inserted into said permeable space to enhance radio frequency signals.

2. The method according to claim 1, wherein the insert comprises or is formed of a metal plate around said space permeable to the radiofrequency field.

3. The method according to claim 1, wherein the relay antenna is made on a support substrate.

4. The method according to claim 1, wherein the space is configured so as to form a wedging plane of the support substrate of the relay antenna in the thickness of the insert.

5. The method according to claim 1, wherein the relay antenna with its supporting substrate is assembled to the insert so as to position the relay antenna opposite said space permeable.

6. The method according to claim 1, wherein said module is inserted into a cavity provided in the card body.

7. The method according to claim 1, wherein said radio frequency module is previously assembled to the relay antenna then inserted into the space with the relay antenna.

8. The method according to claim 1, wherein said relay antenna is configured without a capacitor plate and defines a second antenna spiral entangled in a first antenna spiral.

9. The method according to claim 1, wherein said relay antenna has a total area of between one third and one quarter of the main area of the card.

10. The method according to claim 1, wherein said relay antenna has a surface outside a plumb line of the module equal to 2 to 4 times the surface of a module.

11. The method according to claim 1, wherein said plate comprises a slit cutting the plate through its thickness and extending from an outer periphery of the plate to an inner periphery of said space permeable to the radiofrequency field.

12. A radio frequency smart card comprising:
    a card body comprising a relay antenna and an insulating cover layer on at least one main face of said card;
    a module equipped with a radiofrequency module antenna, arranged on the card body facing the relay antenna for radiofrequency coupling; and
    a metal insert of the card body extending up to the edges of the card, said insert comprising a space permeable to the radio frequency field opening on at least one of the two main faces of the insert and comprising said relay antenna inside and/or opposite this space,
    wherein said relay antenna has a total area equal to three or four times the area of the antenna of the module;
    wherein the substrate of the relay antenna with said total area is inserted into said permeable space to enhance radio frequency signals.

13. The radio frequency card according to claim 12, wherein the insert comprises or is formed of a metal plate around said permeable space.

14. The radio frequency card according to claim 12, wherein said relay antenna is configured without a capacitor plate and defines a second antenna spiral entangled in a first antenna spiral.

* * * * *